HOPPER METERING APPARATUS
Original Filed April 12, 1963 3 Sheets-Sheet 1
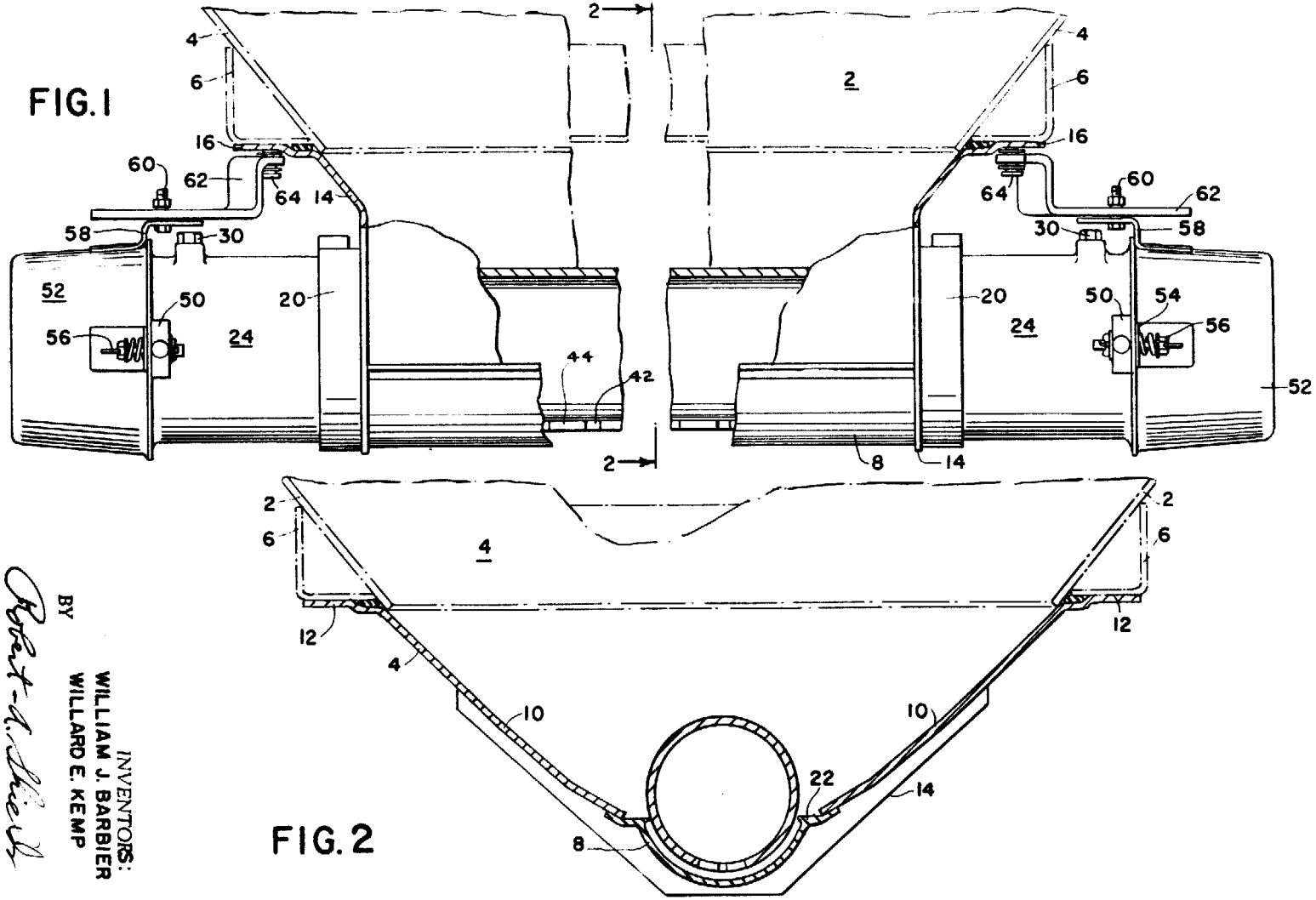
INVENTORS:
WILLIAM J. BARBIER
WILLARD E. KEMP
BY
Robert A. Shields
ATTORNEY

HOPPER METERING APPARATUS

Original Filed April 12, 1963 3 Sheets-Sheet 2

INVENTORS:
WILLIAM J. BARBIER
WILLARD E. KEMP
BY
Robert A. Shields
ATTORNEY

HOPPER METERING APPARATUS

Original Filed April 12, 1963 3 Sheets-Sheet 3

INVENTORS:
WILLIAM J. BARBIER
WILLARD E. KEMP
BY
Robert A. Shields
ATTORNEY

United States Patent Office

Re. 26,424
Reissued July 16, 1968

26,424

HOPPER METERING APPARATUS

Willard E. Kemp and William J. Barbier, St. Louis County, Mo., assignors to ACF Industries, Incorporated, New York, N.Y., a corporation of New Jersey Original No. 3,215,473, dated Nov. 2, 1965, Ser. No. 272,617, Apr. 12, 1963. Application for reissue Feb. 13, 1967, Ser. No. 637,023
16 Claims. (Cl. 302—52)

Matter enclosed in heavy brackets [ ] appears in the original patent but forms no part of this reissue specification; matter printed in italics indicates the additions made by reissue.

*ABSTRACT OF THE DISCLOSURE*

*A hopper metering structure for the pneumatic discharge of particulate material from a hopper including a rotatable pneumatic discharge tube beneath the hopper having a longitudinal slot therein to receive the particulate material for discharge. The tube is rotated to register the slot at a desired opening and the slot is of a dentate configuration to aid rotation of the tube. A flexible strip is disposed along the length of the tube to control any flow of particulate material into the space formed between the tube and the subjacent housing portion.*

This invention relates to special apparatus for unloading particulate materials from hoppers, and particularly from hoppers carried by railway cars and is primarily directed to an apparatus which can be applied as an appendage to a hopper and used to discharge the particulate material by means of an air stream induced either by vacuum or by pressure and conveyed from the hopper through pipe lines to any desired point.

It is an object of the invention to provide an apparatus which can be applied to a hopper particularly of the railway car type and which can be produced at a considerable saving in material and cost over presently existing apparatus or constructions.

A further object of the invention is the production of an apparatus having quickly removable portions or conduits whereby the hopper may be adapted to different particulate materials for producing maximum efficiency of discharge.

A still further object of the invention is the provision of an apparatus for a hopper discharge and having a particular form of metering means for controlling the rate of flow of particulate material into the conveying medium.

These and other objects of the invention will be apparent to persons skilled in the art from a study of the following description and accompanying drawings in which:

FIGURE 1 is a side view of the improved apparatus with portions broken away to better show the construction;

FIG. 2 is a sectional view taken substantially on line 2—2 of FIG. 1;

Figure 3:
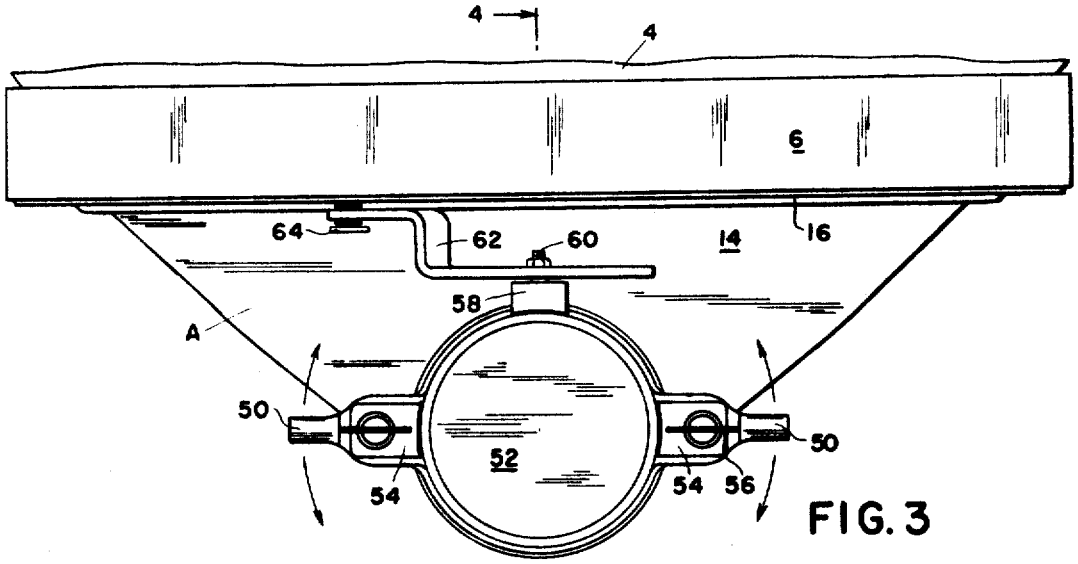
FIG. 3 is an end view of the special apparatus shown in FIG. 1.

Referring now to the drawings in detail, it will be seen that the apparatus has been shown as applied to a hopper having slope sheets 2 and 4 stiffened at their lower edges by angles 6 forming a frame around the hopper discharge opening. The hopper may be of the stationary type or carried by a railway car of the type shown in numerous patents. For example by Patent 2,889,963 and in which case the hopper slope sheets 2 will extend transversely of the car and slope sheets 4 will extend longitudinally of the car.

As clearly shown, the bowl shaped receptacle A is formed with a generally cylindrically curved central portion 8 to which are attached upwardly and outwardly diverging side sheets 10 terminating at their upper edges in outwardly directed flanges 12 which may be secured to the angle frame 6 in any suitable manner. End plates 14 are welded or otherwise secured to the ends of the cylindrically curved portion 8 and to the sheets 10 and have their upper edges flanged as at 16 in the same plane as flanges 12, and also provide for attachment to the angle frame 6 by any suitable means. Each end plate 14 has opening 18 formed therein adjacent the lower portion and a tubular bearing member 20 is welded or otherwise secured to the outer faces of the end plates 14. The lower cylindrically curved portion 8 may be made as an extrusion or a casting or may be formed as a weldment, but in any case will have sealing edges 22 formed therein and projecting inwardly toward each other from opposite sides of the cylindrically curved portion 8. It is of course obvious that the members 8 and 10 may be made as a single generally cylindrically curved pressing to which the end plates 14 are attached or the entire structure forming the receptacle A could be cast in one piece.

Figure 4:
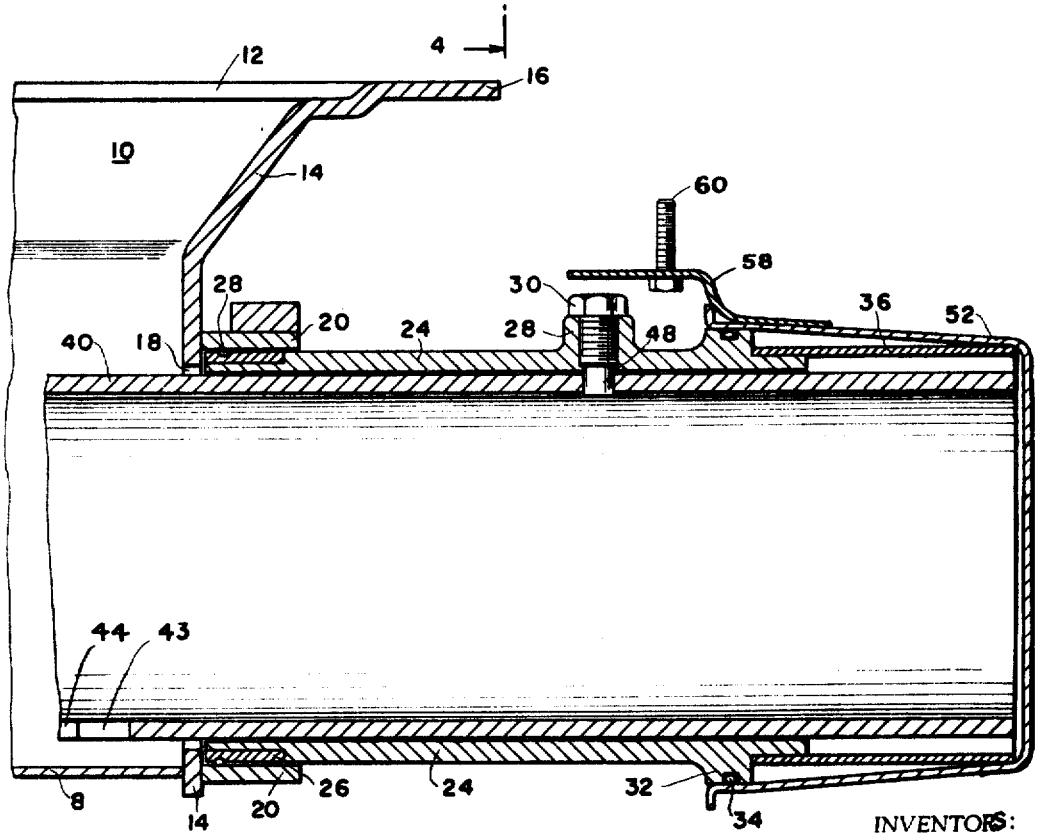
FIG. 4 is a sectional view taken substantially on line 4—4 of FIG. 3.
Figure 5:
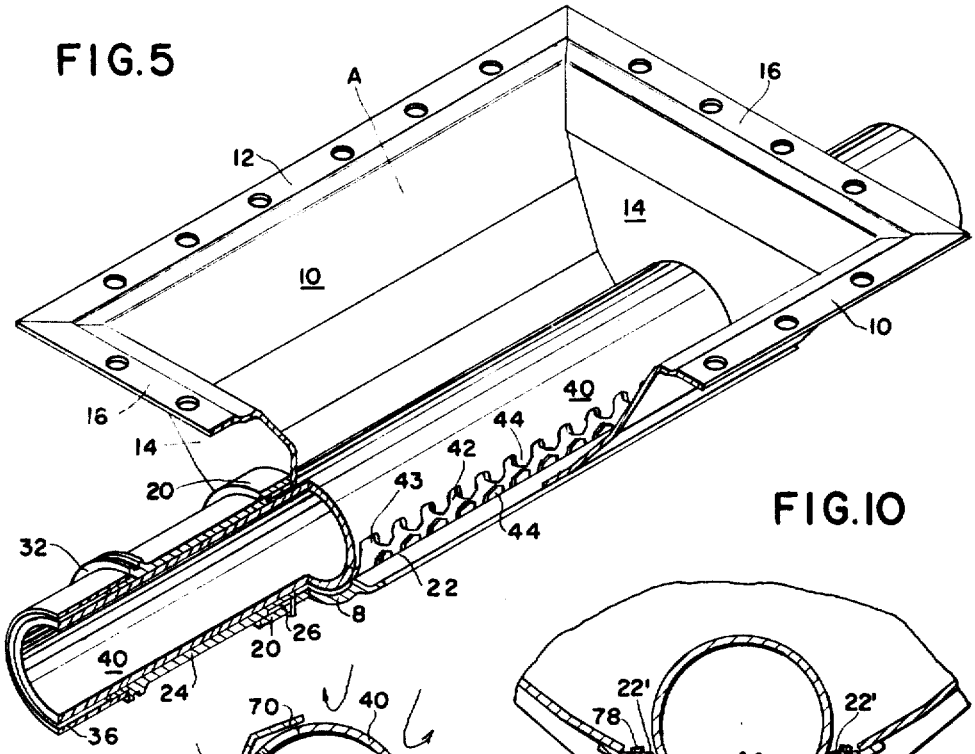
FIG. 5 is a perspective view of the improved apparatus with parts broken away and in section to better show the internal construction.

As clearly shown, particularly in FIGS. 4 and 5, short conduit sections 24 are provided, each having the inner end turned down to receive a bearing member 26 adapted to closely engage within the bearing collar 20 and is provided with sealing means 28 to prevent entrance of moisture or dirt. Outwardly of the bearing area, each conduit 24 is provided with a boss 28 adapted to receive a stud bolt 30, later to be referred to. Adjacent the outer end of each conduit, a circular collar 32 is formed having a groove cut therein to receive an O-ring or other type of seal 34. Outwardly of the collar 32 is preferably attached a thin metallic member 36 forming an extension of the conduit portion 24 and adapted to receive either internally or externally thereof a tube or vacuum hose (not shown).

Figure 6:
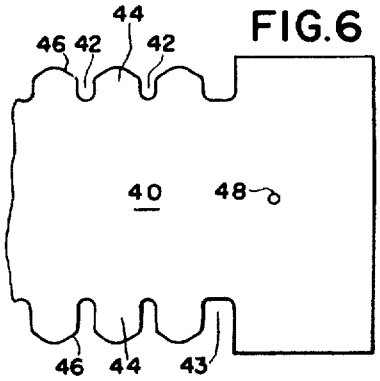
FIG. 6 is a reduced scale view of the conduit during fabrication.

Extending through the receptacle A is a conduit member 40 which is of a length to extend completely across the receptacle and preferably to the ends of the first conduit extension 36. This conduit member 40 is also adapted to receive outwardly of conduit 24 a rubber hose or pipe (not shown). The conduit member 40 may be formed from a piece of pipe, or it may be formed as shown in FIG. 6 from a flat piece of metal which will then be rolled to form the tubular member or conduit. If the tube is formed from a flat sheet, as shown in FIG. 6, the opposite edges will be cut to provide spaced openings 42 with rounded bottoms interposed between which are tooth members 44. The outer edges of these tooth members 44 preferably are tapered, rounded or curved as at 46. The openings 42 and tooth members 44 will have their shape chosen to give the maximum efficiency for the type of particulate material contained in the hopper. As shown the end openings 43 are made of greater width than openings 42, since it has been found that efficiency of discharge is increased. In order to rigidify the tube, certain of the teeth may have their edges brought into contact (not shown) and have the edges welded together, thus stiffening the tube without sacrificing any of the metering properties. In order that the metering tube or conduit 40 may be controlled, two holes 48 are formed therein and adapted to receive the inner ends of the stud bolts 30, previously referred to. The bolts 30 will accordingly lock the two conduit sections 24 to the metering conduit 40, and due to the position of the conduits 24 in the bearing collar 20 externally of end walls 14, the conduits will be held against axial shift. Rotation of the conduits 24 and 40 will be accomplished by means of handles 50 welded or integrally cast with the conduits 24 adjacent the collar 32. Movement of the handles in either direction, as shown by arrows in FIG. 3 will cause rotation of both the short conduit 24 and the metering conduit 40. In order to protect the conduit ends and prevent entrance of moisture or dirt, caps 52 will be placed over the ends of the conduits and engage the O-ring type of seal 34. The caps will be held in position by ears 54 through which extend quick acting fasteners 56 of any suitable design. Adjacent the upper portion of the caps, as clearly shown in FIG. 1 are outstanding brackets 58 of Z form adapted to receive bolts 60 and which bolts are adapted to extend through slots in Z shaped members 62 having the upper inner ends pivotally connected as at 64 to the flanges 16 of the receptacle A. The Z shaped members due to their connection to the caps will prevent accidental or unauthorized rotation of the conduits by any means, such as by handles 50. However, due to the slotted connections between 60 and 62 the caps 52 may be removed after the unfastening of lock means 56, thus conditioning the conduits for rotation by handles 50.

Normally the metering conduit 40 will be positioned as shown in FIG. 2 with the tooth or dentate slot downwardly and between the sealing means 22, thus preventing any flow of particulate material from the receptacle to the conduit 40. As clearly shown, particularly in FIGS. 2 and 4, the conduit 40 closely engages the sealing means 22, but has considerable space between the tube and the curved portion 8. In this manner binding will not occur due to entrance of material between the tube and portion 8. Additionally, any material, such as dust entering the space will be drawn out by the vacuum during rotation and operation of the metering tube my handles 50. It will be seen that as the metering tube or conduit is rotated, either clockwise or counter-clockwise, as viewed in FIG. 3, the dentate slot can be moved above the sealing means 22, as viewed in FIG. 5. As the dentate slot moves past the sealing means 22, it is obvious that varying amounts of openings 42, 43 will be exposed, followed by varying amounts of exposure of the tooth edges 46. If the tube or conduit is further rotated, eventually the entire elongated slots 42 will be exposed, as partially indicated in FIG. 5. Obviously, by these means, very accurate metering control of the flow of particulate material may be obtained. With the forms shown in FIGS. 1, 2 and 5 inclusive, a conduit will need to be rotated both clockwise and counter-clockwise to bring the dentate slot to the desired position above sealing means 22, thereby removing all particulate material from the receptacle.

Figure 7:
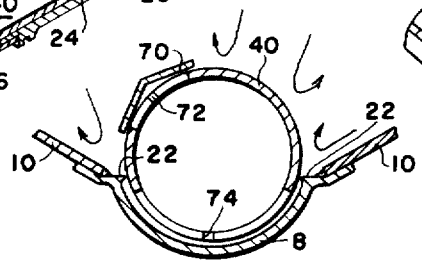
FIG. 7 is a sectional view similar to FIG. 2, but showing a modified form.
Figure 8:
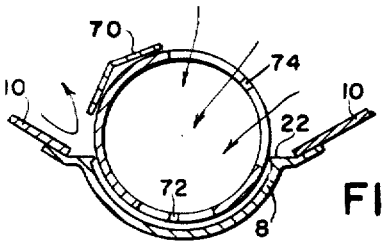
FIG. 8 is a sectional view similar to FIG. 7, but showing the metering conduits in an opened position.
Figure 9:
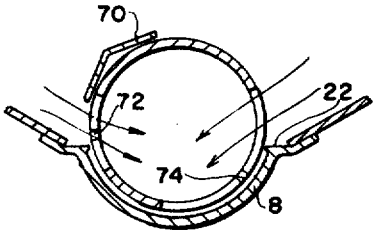
FIG. 9 is a sectional view similar to FIG. 7, but showing the metering conduit in a second opened position, wherein material is fed from both sides of the conduit.

In some cases, it may be desirable to give added control and this may be accomplished as shown in FIGS. 7, 8 and 9 by the addition of a third sealing member 70 which is securely anchored within the receptacle A, and has its spaced edges located closely adjacent the surface of tube 40. In this instance, the tube is formed with a relatively narrow dentate slot 72 located beneath the sealing means 70. Also a relatively wide dentate slot 70 is formed, adapted to be in the lower position adjacent the curved member 8 and beneath the sealing means 22. The dentate slots 72 and 74 will be formed with the same general tooth form, as shown in FIGS. 5 and 6 with the teeth 44 and spaces 42, 43 elongated where necessary and made wider or narrower as required. In this manner, the flow of particulate material is prevented, as indicated by arrows in FIG. 7. If flow of material from both sides of the receptacle is desired, the conduit will be rotated to the position shown in FIG. 9, thereby permitting the particulate material to flow through both narrow slot 72 and portions of the wide dentate slot 74, as indicated by the arrows. In some instances, it may be desirable to have a relatively large flow of material by gravity into the tube and this may be accomplished, as shown in FIG. 8, wherein the wide dentate slot 74 occupies substantially the entire space between one sealing means 22 and the third sealing means 70.

Figure 10:
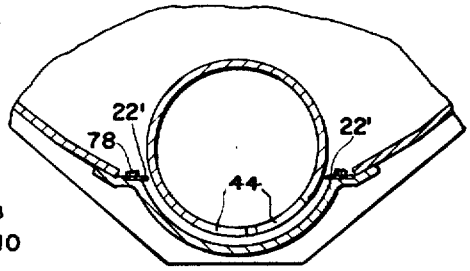
FIG. 10 is a modification of the form shown in FIG. 2 and in which flexible removal sealing means is used.

In the modification shown in FIG. 10, the sealing means 22 instead of being formed of an integral part of the member 22 is formed as removable flexible sealing strips 22[1] held in place by any suitable means, such as bolts or cap screws 78. With this form, machining and construction cost are greatly reduced, since the sealing strips 22[1] may be moved substantially into contact with a very close clearance, after which the cap screws or bolts 78 will be tightened. Preferably the thin sealing strips 22[1] are made flexible so as to prevent any jamming that might occur through the entrainment of hard particulate particles as the bottoms of openings 42 move past the sealing strips during movement of the conduit to the closed position, shown in FIG. 10.

From the preceding, it will be seen that a receptacle has been provided which can be attached quickly to an existing hopper of either the stationary or railway car type and which can be adjusted to effectively and accurately control the flow of particulate material into the conduit 40 and thence into the vacuum hose or tube (not shown). The use of the dentate slots will permit extremely accurate metering control of the flow of particulate material. While the type of dentate slot shown will, due to its form, control a wide range of particulate material, it may be desirable to change the tooth and opening form to cover other ranges of particulate material, but this may be readily done by merely removing the caps 52 and at least one of the stud bolts 30 after which the entire tube 40 may be removed and one having a different dentate slot inserted.

Various changes in the details and construction of the previously described apparatus may be made without departing from the spirit and scope of the invention as defined in the following claims.

What is claimed is:

1. Apparatus forming an appendage to a hopper for containing particulate material, comprising, a bowl shaped receptacle attached to the hopper and closing the same to retain the particulate material therein, a first conduit means carried by said bowl shaped receptacle and extending outwardly thereof, said first conduit means giving access to the interior of said bowl shaped receptacle, a second conduit means mounted within said first conduit means, for rotational movement with respect to said receptacle, said second conduit means having an inner portion extending inwardly beyond said first conduit means into said bowl shaped receptacle and an outer portion extending outwardly beyond the outer end of said first conduit means, longitudinally extending sealing means secured to said bowl-shaped receptacle adjacent the bottom thereof and bearing upon spaced apart portions of said second conduit below a horizontal plane through the axis thereof, and a dentate slot formed in said inner portion of said second conduit whereby upon rotation of said second conduit the rate of flow of particulate material from said receptacle into said second conduit may be controlled.

2. Apparatus forming an appendage to a hopper for containing particulate material, comprising, a receptacle attached to the hopper and closing the same to retain the particulate material therein, bearing sleeves secured to said receptacle exteriorly thereof, conduit means mounted in said bearing sleeves for rotational movement with respect to the receptacle, said conduit means having an outer portion exterior of said receptacle and an inner portion positioned within said receptacle, said inner portion being supported in said receptacle in substantial spaced relation thereto, spaced sealing means formed on said receptacle and extending longitudinally of the conduit and engaging said conduit inner portion adjacent the lower part thereof and at spaced apart portions, and a dentate slot formed in said conduit inner portion to control the flow of particulate material from the hopper into said conduit upon rotation of said conduit means.

3. The apparatus recited in claim 2 in which said conduit during rotation exposes predetermined dentate slot and continuous slot areas above said sealing means to thereby control the rate of flow of particulate material into said conduit.

4. The apparatus recited in claim 2 in which said sealing means is formed as flexible means detachably secured to said receptacle to have wiping engagement with said conduit inner portion.

5. Apparatus forming an appendage to a hopper for containing particulate material, comprising, a receptacle attached to the hopper and closing the same to retain the particulate material therein, bearing sleeves secured to said receptacle exteriorly thereof, conduit means mounted in said bearing sleeves for rotational movement with respect to the receptacle, said conduit means having an outer portion exterior of said receptacle and an inner portion positioned within said receptacle, said inner portion being supported in said receptacle in spaced relation thereto, at least three longitudinally extending sealing means secured to said receptacle and having sealing engagement with said conduit inner portion at a plurality of spaced apart portions, and a pair of independent spaced dentate slots formed in said conduit inner portion for the flow of particulate material from at least two areas of the hopper into said conduit upon rotation of said conduit.

6. Apparatus forming an appendage to a hopper for containing particulate material, comprising, a receptacle attached to the hopper and closing the same to retain the particulate material therein, bearing sleeves secured to said receptacle exteriorly thereof, conduit means mounted in said bearing sleeves for rotational movement with respect to the receptacle, said conduit means having an outer portion exterior of said receptacle and an inner portion positioned within said receptacle, said inner portion being supported in said receptacle in spaced relation thereto, a pair of sealing means secured to said receptacle and engaging said conduit inner portion at spaced portions below a horizontal plane through the axis of said conduit means, and a third sealing means secured to said receptacle and engaging said conduit inner portion at two spaced portions located above the horizontal plane through the axis of said conduit means, and independent spaced apart openings in said conduit inner portion and closed by said sealing means when said conduit is in closed position.

7. The apparatus recited in claim 6 in which said independent spaced apart openings are formed as dentate slots of rounded tooth form.

8. Apparatus forming an appendage to a hopper for containing particulate material, comprising, a receptacle attached to the hopper and closing the same to retain the particulate material therein, bearing sleeves secured to said receptacle exteriorly thereof, conduit means mounted in said bearing sleeves for rotational movement with respect to the receptacle, said conduit means having an outer portion exterior of said receptacle and an inner portion positioned within said receptacle, said inner portion being supported in said receptacle in substantial spaced relation thereto, spaced sealing means formed on said receptacle and engaging said conduit inner portion at spaced apart portions positioned below a horizontal plane through the axes of said conduit means, and a dentate slot formed in said conduit means inner portion for the flow of particulate material from the hopper into said conduit when said conduit is rotated to place portions of said dentate slot above one of said sealing means.

9. The apparatus recited in claim 8 in which said dentate slot is formed by teeth having rounded ends separated by rounded bottom spaces.

10. Apparatus for the control of flow of particulate material comprising, conduit means having end portions, an intermediate portion, joining the end portions a dentate slot formed in said intermediate portion and extending longitudinally thereof, cylindrical bearing means rotatably supporting the end portions of said conduit means, cylindrically curved means connecting said bearing means and opening upwardly to house the lower part of said intermediate portion, and sealing means formed on said cylindrically curved means adjacent the upper edges thereof and closely engaging the intermediate portion of said conduit means to thereby control flow of particulate material into said dentate slot during rotation of said conduit means.

11. The apparatus recited in claim 10 in which said sealing means engage said conduit means at portions spaced apart and equidistant below a horizontal plane through the axis of said conduit means.

12. The apparatus recited in claim 10 in which said dentate slot is formed by rounded tip teeth spaced apart by spaces having rounded bottoms.

13. Apparatus recited in claim 12 in which the spaces adjacent the ends of the dentate slot are of greater width than the spaces intermediate the ends thereof.

14. Apparatus recited in claim 10 in which said sealing means comprises flexible strips adjustably carried by said cylindrically curved means whereby wiping engagement with said conduit means may be obtained to prevent flow of particulate material into said upwardly open cylindrically curved means.

15. The apparatus recited in claim 10 in which said sealing means has an upper surface substantially normal to the walls of said conduit means, and said conduit means is spaced a substantial distance from said cylindrically curved means below said sealing means.

*16. Apparatus forming an appendage to a hopper for containing particulate material, comprising, a bowl-shaped receptacle attached to the hopper and closing the same to retain the particulate material therein, said bowl-shaped receptacle including a pair of opposed side sheets having spaced lower ends and a downwardly extending generally cylindrical curved portion connecting the spaced lower ends, bearing sleeves secured to said receptacle, a tube mounted in said bearing sleeves for rotational movement with respect to the receptacle, said tube having end portions mounted in said bearing sleeves and an intermediate portion joining the end portions, said generally cylindrical portion opening upwardly in the area between the spaced lower ends of the side sheets to house the lower part of said intermediate portion and being spaced from said in-*

*termediate portion, a slot formed in the intermediate portion of said tube and extending longitudinally thereof whereby upon rotation of said tube the rate of flow of particulate material from the hopper into the tube may be controlled, and a flexible strip carried by said curved portion generally at the juncture of each side sheet with the curved portion, said flexible strip disposed adjacent the intermediate portion of said tube for substantially the entire length of said intermediate portion and extending toward the tube to restrict and control any flow of particulate material into the space formed between the tube and the curved portion.*

References Cited

The following references, cited by the Examiner, are of record in the patented file of this patent or the original patent.

UNITED STATES PATENTS

| | | | |
|---|---|---|---|
| 2,650,726 | 9/1953 | Aller et al. | 302—52 |
| 2,858,165 | 10/1958 | Oliver | 302—36 |
| 2,919,158 | 12/1959 | Aller | 302—52 |
| 3,048,448 | 8/1962 | Aller | 302—52 |
| 3,050,342 | 8/1962 | Koranda et al. | 302—52 |

ANDRES H. NIELSEN, *Primary Examiner.*